United States Patent
Biffi et al.

(10) Patent No.: US 12,472,214 B2
(45) Date of Patent: Nov. 18, 2025

(54) BACTERIAL STRAINS, THE COMPOSITIONS THEREOF AND USE THEREOF IN A METHOD FOR THE TREATMENT OF VITAMIN D DEFICIENCY, AND DISORDERS ASSOCIATED THEREWITH

(71) Applicant: ALFASIGMA S.P.A., Bologna (IT)

(72) Inventors: Andrea Biffi, Trezzano Rosa (IT); Walter Fiore, Trezzano Rosa (IT)

(73) Assignee: ALFASIGMA S.P.A, Bologna (IT)

( * ) Notice: Subject to any disclaimer, the term of this patent is extended or adjusted under 35 U.S.C. 154(b) by 436 days.

(21) Appl. No.: 17/798,882

(22) PCT Filed: Apr. 28, 2021

(86) PCT No.: PCT/IB2021/052523
§ 371 (c)(1),
(2) Date: Aug. 10, 2022

(87) PCT Pub. No.: WO2021/191855
PCT Pub. Date: Sep. 30, 2021

(65) Prior Publication Data
US 2023/0190833 A1 Jun. 22, 2023

(30) Foreign Application Priority Data
Mar. 26, 2020 (IT) ........................ 102020000006448

(51) Int. Cl.
*A61K 35/747* (2015.01)
*A61K 31/593* (2006.01)
*A61P 3/02* (2006.01)

(52) U.S. Cl.
CPC .......... *A61K 35/747* (2013.01); *A61K 31/593* (2013.01); *A61P 3/02* (2018.01)

(58) Field of Classification Search
CPC .. A61K 35/747; A61K 31/593; A61K 35/745; A61P 3/02; A61P 3/04; A61P 3/10; A61P 9/00; A61P 9/12; A61P 25/00; A61P 25/28; A61P 35/00; A61P 43/00
See application file for complete search history.

(56) References Cited

U.S. PATENT DOCUMENTS

| | | |
|---|---|---|
| 2012/0114608 A1 | 5/2012 | Ebel et al. |
| 2017/0246262 A1 | 8/2017 | Latefi |

FOREIGN PATENT DOCUMENTS

| | | | |
|---|---|---|---|
| EP | 2385837 A2 | 11/2011 | |
| EP | 2455093 A1 | 5/2012 | |
| EP | 3194567 A1 | 7/2017 | |
| KR | 20120064416 A | 6/2012 | |
| WO | WO 01/72322 A2 | 10/2001 | |
| WO | WO 2006/047744 A2 | 5/2006 | |
| WO | WO 2010/081126 A2 | 7/2010 | |
| WO | WO 2016/030504 A1 | 3/2016 | |
| WO | WO 2019/089878 A1 | 5/2019 | |
| WO | WO 2019/243168 A1 | 12/2019 | |

OTHER PUBLICATIONS

Lei M, Guo C, Wang Y, Hua L, Xue S, Yu D, Zhang C, Wang D., Asia Pac J Clin Nutr. 2018;27(6):1252-1257. doi: 10.6133/apjen.201811_27(6).0012 (Year: 2018).*
Arioli et al., Front. Microbiol., 2018, Sec. Food Microbiology, vol. 9, Article 1720, doi.org/10.3389/fmicb.2018.01720. (Year: 2018).*
Laird etal., Nutrients 2010, 2, 693-724; doi: 10.3390/nu2070693. (Year: 2010).*
Balzaretti, "Exploring Lactobacillus paracasei probiosis and metabolic potential", Internet Citation, 2015, pp. 1-132, retrieved from the Internet: URL:https://air.unimi.it/retrieve/handle/2434/336570/476477/phd_unimi_R10033.pdf.
Strate et al., "Antiviral activities of lactoferrin" Antiviral Research, 2001, 52: 225-239.
Valenti et al., "Lactoferrin: an important host defence against microbial and viral attack", Cellular and Molecular Life Sciences, 2005, 62: 2576-2587.
Jones et al., "Oral Supplementation With Probiotic L. reuteri NCIMB 30242 Increases Mean Circulating 25-Hydroxyvitamin D: A Post Hoc Analysis of a Randomized Controlled Trial", Journal of Clinical Endorcrinology Metabolism, 2013, 98(7): 2944-2951.
Shang et al., "Vitamin D/VDR, probiotics, and gastrointestinal diseases", Current Medicinal Chemistry, 2017, 24(9): 876-887.
Gokhale et al., "Provitamin D3 modulation through prebiotics supplementation: simulation based assessment", Scientific Reports, 2019, 9: 19267.
Caccamo et al., "Health Risks of Hypovitaminosis D: A Review of New Molecular Insights", International Journal of Molecular Sciences, 2018, 19, 892, 18 pages.
Ostadmohammadi et al., "Vitamin D and probiotic co-supplementation affects mental health, hormonal, inflammatory and oxidative stress parameters in women with polycystic ovary syndrome", Journal of Ovarian Research, 2019, 12:5, 8 pages.
Yoon et al., "Probiotic Regulation of Vitamin D Receptor in Intestinal Inflammation", Gastroenterology, 2011, 140(5): S-19.
Radicioni et al., "Survival of L. casei DG (Lactobacillus paracasei CNCMI1572) in the gastrointestinal tract of a healthy paediatric population", European Journal of Nutrition, 2019, 58: 3161-3170.

* cited by examiner

*Primary Examiner* — Kade Ariani
(74) *Attorney, Agent, or Firm* — Silvia Salvadori, P.C.; Silvia Salvadori

(57) ABSTRACT

The present invention relates to bacterial strains for use in the treatment of vitamin D deficiency and/or insufficiency and/or diseases, symptoms and/or disorders associated thereto. Furthermore, the present invention relates to compositions comprising at least one of said bacterial strains and at least one vitamin D, preferably vitamin D3, and to the use thereof in the treatment of said vitamin D deficiency and/or insufficiency and/or diseases, symptoms or disorders associated thereto.

6 Claims, 3 Drawing Sheets

Specification includes a Sequence Listing.

BACTERIAL STRAINS, THE COMPOSITIONS THEREOF AND USE THEREOF IN A METHOD FOR THE TREATMENT OF VITAMIN D DEFICIENCY, AND DISORDERS ASSOCIATED THEREWITH

CROSS-REFERENCE TO RELATED APPLICATIONS

This application is a § 371 national phase of International Application No. PCT/IB2021/052523, filed on Apr. 28, 2021, which claims the benefit of Italian Application No. 102020000006448, filed on Mar. 26, 2020, all of which applications are incorporated by reference herein.

The present invention relates to bacterial strains for use in a method for the treatment of a vitamin D deficiency and/or insufficiency (or hypovitaminosis D) and/or of diseases, symptoms and/or disorders associated with said vitamin D deficiency and/or insufficiency. Furthermore, the present invention relates to compositions comprising at least one of said bacterial strains and at least one vitamin D, preferably vitamin D3 and/or vitamin D2, and to the use thereof in a method for the treatment of said vitamin D deficiency and/or insufficiency or diseases, symptoms and/or disorders associated with.

Vitamin D is a group of fat-soluble prohormones consisting of 5 different vitamins: vitamin D1, D2, D3, D4 and D5. The two most important forms in which vitamin D can be found are vitamin D2 and vitamin D3, both of which have very similar biological activity. Besides being absorbed from food, vitamin D is produced at the skin level. By means of this mechanism, only vitamin D3 is produced and not vitamin D2, which is exclusively produced by plants and it can be taken by humans only through food. As a matter of fact, cholecalciferol (D3), deriving from cholesterol, is synthesized in animal organisms, while ergocalciferol (D2) is of plant origin.

The absorption of vitamin D follows the similar processes to which the other fat-soluble vitamins are subjected. As a matter of fact, it is incorporated into the micelles formed by the meeting of hydrolysed lipids with bile, it enters the intestinal epithelium where it is incorporated into chylomicrons which enter the lymphatic circulation. Vitamin D3 (cholecalciferol), obtained from solar exposure or through diet, is present in foods and dietary supplements in a biologically inactive form and it must undergo two hydroxylation reactions to be transformed into the biologically active form, calcitriol (abbreviated as 1,25(OH)2 D). In various tissues the cholecalciferol undergoes a hydroxylation reaction with formation of 25-hydroxycholecalciferol (abbreviated as 25(OH)$_2$D) which passes into the general circulation and it binds to a specific carrier protein (vitamin D binding protein, DBP). The form 25(OH)$_2$D is the inactive intermediate which requires activation by means of subsequent hydroxylation to perform the biological function thereof. Upon reaching the kidney, calcifediol (25(OH)$_2$D) undergoes a hydroxylation reaction, catalysed by the enzyme 25(OH)D-1α-hydroxylase, giving rise to calcitriol (1,25-dihydroxycholecalciferol, abbreviated as 1,25(OH)$_2$D) which is the active form of vitamin D3.

The measurement of serum concentration of calcifediol (25(OH)$_2$D) is the diagnostic tool for assessing the condition of patients with respect to vitamin D. Blood levels of vitamin D3 (form 25(OH)$_2$D) are normally expressed in nmol/litre or ng/ml of serum. In humans, deficient conditions are identified for values of 25(OH)$_2$D lower than 20 ng/ml serum, while values in the range of 20-30 are considered insufficient in any case.

The active form of vitamin D, 1,25(OH)$_2$D, is an important hormone regulating body calcium and it is indispensable for the maintenance of calcium and bone homeostasis. It acts by binding to the vitamin D receptor (VDR) which belongs to the superfamily of nuclear receptors. Various disorders from impaired function of vitamin D, including vitamin D deficiency, genetic defects in the vitamin-D activating enzyme, 25-hydroxyvitamin D 1α-hydroxylase or in the vitamin D receptor (VDR), lead to rickets or osteomalacia characterised by hypocalcaemia, hypophosphatemia, secondary hyperparathyroidism and bone abnormalities due to demineralisation defects. Furthermore, vitamin D receptor is known to be expressed in a broad spectrum of tissues not related to calcium and bone metabolism and, as a result, vitamin D has been shown to modulate in-vitro fundamental cellular processes such as proliferation, differentiation and survival of various cell lines.

In most cases, the active form 1,25(OH)$_2$D acts as the "on" switch and the inactive form 25(OH)$_2$D as the "off" switch of the vitamin D receptor control system, although this mechanism has not yet been elucidated for all tissues and organs in which the vitamin D receptor is present. It would appear that activation of the nuclear vitamin D receptor (VDR) is achieved through a delicate balance between concentrations of a given number of endogenous hormones. As a matter of fact, the body increases or decreases the production of 1,25(OH)$_2$D to control the innate immune response. Exposure to lesions and infections increases the production of 1,25(OH)$_2$D, which in turn leads to the creation of antimicrobial peptides and TLR2 activation. However, there are also some feedback mechanisms that allow the organism to limit the production of 1,25(OH)$_2$D to that amount necessary for an adequate transcriptional activation of VDR. When VDR is activated, it transcribes the CYP24A1 enzyme gene, which increases the conversion of 1,25(OH)$_2$D to inactive metabolites. An activated VDR also controls the concentration of 1,25(OH)$_2$D by limiting transcription of the CYP27B1 gene, which converts 25(OH)$_2$D to 1,25(OH)$_2$D.

Vitamin D deficiency may expose the organism to an increased risk of developing osteoporosis, cardiovascular diseases, diabetes, and cancer. This deficiency condition is not only linked to dietary deficiencies, but also to deficiencies in the decrease in vitamin D absorption. For example, therapies to decrease blood cholesterol levels may lead to a decrease in the absorption of other sterols and thus to a decrease in the absorption of fat-soluble vitamins, including vitamin D3.

The most recent scientific evidence confirms the importance of vitamin D and the correct absorption thereof in the maintenance of intestinal homeostasis and in the interaction between microbiota and host. The initial composition of the gut microbiota can significantly affect the development of the immune system. Early changes in this process at a time of dynamic changes in the infant intestine, may have long-term effects on health. It is not known whether and how vitamin D deficiency can affect the composition of the gut microbiota. On the one hand, the decrease in vitamin D intake has been linked with the differences in the composition of the faecal microbiota, on the other, given the role of vitamin D in the development and function of T-regulatory and dendritic cells, it is possible that the state of the host's vitamin D may modify the effect of the gut microbiota on the immune system. Thus, emerging evidence suggests that the vitamin D pathway is a potentially important modifier of the effects of gut flora on inflammatory disorders. For example, mice that do not have vitamin D receptor (VDR) have chronic, low-grade inflammation in the gastrointestinal tract. Furthermore, the absence of VDR leads to further inflammation in response to the resident microbiota, normally non-pathogenic. It has also been shown that intestinal VDR may be directly involved in the suppression of bacterial-induced NF-κB activation. Commensal bacterial colonization affects both the distribution and expression of VDR in intestinal epithelial cells, suggesting a dynamic interaction between bacteria and the receptor.

Currently, the therapies available for the treatment of vitamin D deficiency and/or insufficiency are based mainly on the administration of vitamin D, preferably vitamin D3 in the form of cholecalciferol, on the consumption of foods rich in vitamin D, and on lifestyle, such as physical activity and exposure to the sun. However, the aforementioned treatments often do not allow an effective and/or rapid resolution of vitamin D deficiency and/or insufficiency and related disorders. Furthermore, it has been shown that therapies to decrease blood cholesterol levels can also lead to a decrease in the absorption of other sterols, such as for example fat-soluble vitamins such as vitamins of group D.

Thus, there remains high need to be able to provide an effective, useful and advantageous solution having a latency time between the administration of the product and the effect (i.e., onset) as reduced as possible to treat vitamin D deficiency and/or insufficiency and disorders associated/related with said deficiency and/or insufficiency in subjects in need, and therefore to provide novel therapeutic approaches that increase the blood absorption and/or bioavailability of vitamin D, in particular of vitamin D3 and/or vitamin D2, in said subjects. In particular, the need is felt to provide an effective, useful and advantageous solution for treating vitamin D deficiency and/or insufficiency in subjects with problems in the absorption of sterols, such as for example subjects administered with therapies that decrease blood cholesterol levels. Lastly, there also arises the need for therapeutic approaches that increase the blood absorption and/or bioavailability of vitamin D, in particular vitamin D3 and/or vitamin D2, without this leading to an increase in the blood cholesterol level.

The article subject of literature by Mitchell L. Jones et al (*J. Clinical Endocrinology and Metabolism*, vol. 98, no. 7, 1 Jul. 2013) describes the use of the probiotic strain *Lactobacillus reuteri* NCIMB 30242 to increase the levels of 25-hydroxyvitamin D (D3), while the use of bacterial strains belonging to the species *Lactobacillus paracasei* is not described.

Following extensive research and development activity, the Applicant addresses and solves the aforementioned needs by providing specific isolated bacterial strains belonging to the species *Lactobacillus paracasei* (reclassified *Lacticaseibacillus paracasei*), capable of increasing—effectively and/or with a minimum and reduced onset—the blood absorption and/or bioavailability of vitamin D, in particular of vitamin D3 and/or vitamin D2 in subjects in need. Furthermore, thanks to the aforementioned specific isolated bacterial strains, the Applicant developed and improved compositions comprising a mixture comprising or, alternatively, consisting of at least one of said bacterial strains and at least one vitamin D, preferably vitamin D3 and/or vitamin D2, as reported in the present description and in the attached claims.

Advantageously, the aforementioned specific isolated bacterial strains, preferably bacterial strains belonging to the species *Lactobacillus paracasei*, and the compositions containing the same, subject of the present invention, do not have significant side effects and can therefore be administered to all subjects, in particular also to paediatric subjects, the elderly, hypercholesterolemic subjects and pregnant women.

Lastly, the compositions of the invention are effective, easy to prepare and cost-effective.

These and other objects, which will be apparent from the detailed description that follows and from the attached claims, were achieved thanks to the isolated bacterial strains, preferably bacterial strains belonging to the species *Lactobacillus paracasei*, to the mixtures and to the compositions containing said isolated bacterial strains, subject of the present invention.

DESCRIPTION OF THE FIGURES

FIG. 1.*b* is is a chart for the quantification of vitamin D3 serum levels in the in vivo study reported in the experimental part (A.2). The statistics are based on the unpaired Student's t-test (**, $P<0.0001$; *, $P<0.001$; **, $P<0.01$; *, $P<0.05$).

DEFINITIONS

Figure 1:
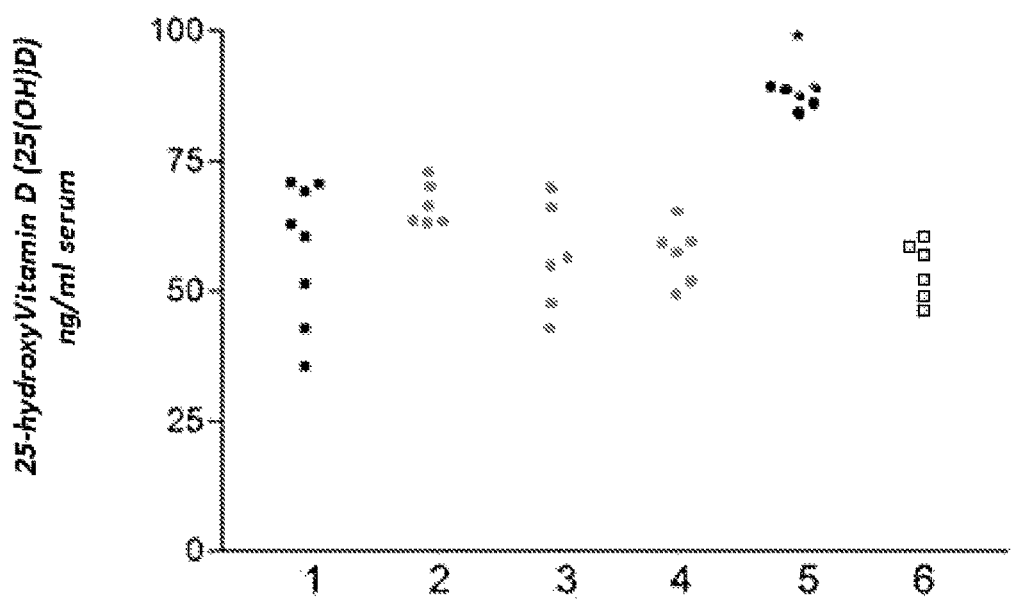
FIG. 1 is a chart for the quantification of vitamin D3 serum levels as data distribution (Panel A) and as the mean quantitation value of each evaluated group (Panel B) quantified in the in vivo study reported in the experimental part (A.2).
Figure 1:
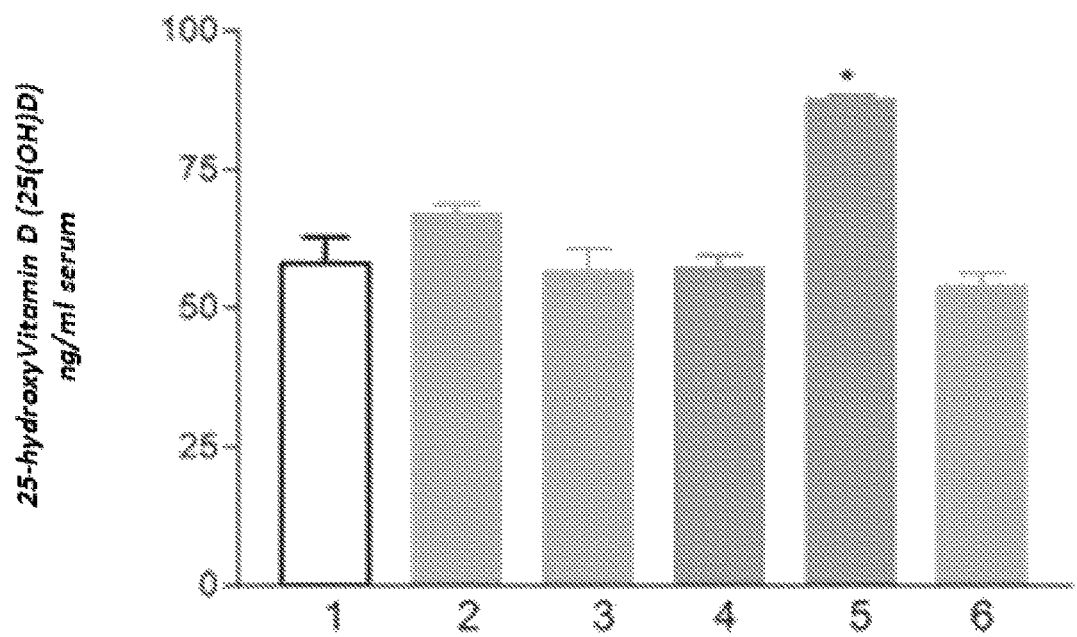

The expression "bioavailability" as used herein is used to indicate the amount of a molecule administered (e.g. vitamin D) which reaches the blood circulatory system (blood levels or serum levels) in an unmodified and/or modified manner.

In the context of the present invention, the expression "vitamin D" is used to indicate all the vitamin species of group D, such as vitamin D1, D2, D3, D4 and D5; preferably vitamin D2 and/or vitamin D3, more preferably vitamin D3.

The expression "vitamin D2" is used to indicate all isoforms of vitamin D2, including ergocalciferol (synonym: (3β,5Z,7E,22E)-9,10-secoergosta-5,7,10(19),22-tetraen-3-ol) and ergosterol (biological precursor of ergocalciferol, given that ergosterol is transformed into ergocalciferol by the action of ultraviolet light); preferably, the vitamin D2 administered to a subject is vitamin D2 in the form of ergocalciferol.

The expression "vitamin D3" is used to indicate vitamin D3 in all isoforms thereof, including cholecalciferol (synonym: cholecalciferol or vitamin D3), calcifediol (synonym: calcidiol, 25-hydroxycholecalciferol, or 25-hydroxyvitamin D, abbreviated as $25(OH)_2D$), calcitriol (synonym: 1A,25-dihydroxycholecalciferol or 1α,25-dihydroxyvitamin D, abbreviated as $1,25(OH)_2D$), and 7-dehydrocholesterol (biological precursor of cholecalciferol, given that 7-dehydrocholesterol is transformed into cholecalciferol after exposure to ultraviolet radiation); preferably, the vitamin D3 administered to a subject is vitamin D3 in the form of cholecalciferol.

The expression "international unit" (IU) as used herein is used to indicate a unit of measurement of the amount of a substance which causes a determined internationally recognised biological effect.

In the context of the present invention, the expression "subject/s" is used to indicate human or animal subjects, preferably mammals (e.g. pets such as dogs, cats, horses, sheep or bovines). Preferably, the compositions of the invention are for use in methods for the treatment of human subjects.

The expression "therapeutically effective amount" is used to indicate the amount of mixture or compound or formulation or bacterial strain that elicits the biological or medicinal response in a tissue, system or subject which is sought and defined by a man skilled in the art.

DETAILED DESCRIPTION OF THE INVENTION

Forming an object of the present invention is an (I) isolated bacterial strain, or a derivative thereof, belonging to a species belonging to the genus *Lactobacillus* for use in the preventive and/or curative treatment of a vitamin D deficiency and/or insufficiency (or hypovitaminosis D) and/or of a disease, symptom and/or disorder associated with said vitamin D deficiency, preferably vitamin D2 and/or vitamin D3, more preferably vitamin D3, in a subject in need (in short, bacterial strain/s for use of the invention or (I)), wherein said species is selected from the group comprising or, alternatively, consisting of: *Lactobacillus paracasei, Lactobacillus acidophilus, Lactobacillus rhamnosus, Lactobacillus amylolyticus, Lactobacillus amylovorus, Lactobacillus alimentarius, Lactobacillus aviaries, Lactobacillus brevis, Lactobacillus buchneri, Lactobacillus casei, Lactobacillus cellobiosus, Lactobacillus coryniformis, Lactobacillus crispatus, Lactobacillus curvatus, Lactobacillus delbrueckii, Lactobacillus farciminis, Lactobacillus fermentum, Lactobacillus gallinarum, Lactobacillus gasseri, Lactobacillus helveticus, Lactobacillus hilgardii, Lactobacillus johnsonii, Lactobacillus kefiranofaciens, Lactobacillus kefiri, Lactobacillus mucosae, Lactobacillus panis, Lactobacillus collinoides, Lactobacillus paraplantarum, Lactobacillus pentosus, Lactobacillus plantarum, Lactobacillus pontis, Lactobacillus reuteri, Lactobacillus sakei, Lactobacillus salivarius* and *Lactobacillus sanfranciscensis*; preferably belonging to a species selected from the group comprising or, alternatively, consisting of: *Lactobacillus paracasei* and *Lactobacillus plantarum*; even more preferably *Lactobacillus paracasei*.

As reported in the article by Zheng et al. *Int. (J. Syst. Evol. Microbiol.*, 70(4):2782-2858, 2020), the species belonging to the genus *Lactobacillus* were reclassified, for example the species *paracasei* was reclassified as *Lacticaseibacillus paracasei* and the species *Lacticobacillus plantarum* was reclassified as *Lactiplantibacillus plantarum*.

In the context of the present description, prior to the aforementioned reclassification, the names of the species of the bacterial strains belonging to the genus *Lactobacillus* are equivalent and used interchangeably with respect to the names identifying said species after reclassification. For example, the terms *Lacticobacillus paracasei* and *Lacticaseibacillus paracasei*, or *Lacticobacillus plantarum* and *Lactiplantibacillus palantarum* are mutually equivalent and used interchangeably.

Forming an object of the present invention is an (I) isolated bacterial strain, or a derivative thereof, belonging to a species belonging to the genus *Bifidobacterium* for use in the preventive and/or curative treatment of a vitamin D deficiency and/or insufficiency (or hypovitaminosis D) and/or of a disease, symptom and/or disorder associated with said vitamin D deficiency, preferably vitamin D2 and/or vitamin D3, more preferably vitamin D3, in a subject in need (in short, bacterial strain/s for use of the invention or (I)), wherein said species is selected from the group comprising or, alternatively, consisting of: *Bifidobacterium animalis, Bifidobacterium bifidum, Bifidobacterium breve, Bifidobacterium infantis, Bifidobacterium longum, Bifidobacterium adolescentis, Bifidobacterium catenulatum, Bifidobacterium angulatum, Bifidobacterium asteroides, Bifidobacterium boum, Bifidobacterium choerinum, Bifidobacterium coryneforme, Bifidobacterium cuniculi, Bifidobacterium denticolens, Bifidobacterium dentium, Bifidobacterium gallicum, Bifidobacterium gallinarum, Bifidobacterium indicum, Bifidobacterium inopinatum, Bifidobacterium lactis, Bifidobacterium magnum, Bifidobacterium merycicum, Bifidobacterium minimum, Bifidobacterium pseudocatenulatum, Bifidobacterium pseudolongum, Bifidobacterium pullorum, Bifidobacterium ruminantium, Bifidobacterium saeculare, Bifidobacterium subtile, Bifidobacterium thermacidophilum, Bifidobacterium thermophilum* and *Bifidobacterium tsurumiense*; preferably belonging to a species selected from the group comprising or, alternatively, consisting of: *Bifidobacterium breve, Bifidobacterium animalis* subsp. *lactis* and *Bifidobacterium bifidum*; even more preferably *Bifidobacterium bifidum*.

In particular, forming an object of the present invention is an (I) isolated bacterial strain, or a derivative thereof, belonging to a species selected from the group comprising or, alternatively, consisting of: *Lactobacillus paracasei, Lactobacillus plantarum, Bifidobacterium breve, Bifidobacterium animalis* subsp. *lactis, Bifidobacterium bifidum* and a mixture thereof (preferably the species *Lactobacillus paracasei*), for use in the preventive and/or curative treatment of a vitamin D deficiency and/or insufficiency (or hypovitaminosis D) and/or of a disease, symptom and/or disorder associated with said vitamin D deficiency, preferably vitamin D2 and/or vitamin D3, more preferably vitamin D3, in a subject in need (in short, bacterial strain/s for use of the invention or (I)).

The term "an isolated strain of bacteria" is used to indicate an isolated bacterial strain according to the standard techniques and equipment known to the man skilled in the art.

In a preferred embodiment of the invention, said (I) bacterial strain of the invention, or a derivative thereof, for use in said method for the treatment of a vitamin D deficiency and/or insufficiency is selected from the group comprising or, alternatively, consisting of at least:

(I.i) an isolated bacterial strain belonging to the species *Lactobacillus paracasei* identified as *Lactobacillus paracasei* DG® (trademark registered by SOFAR S.p.A.) and deposited at the National Collection of Cultures of Microorganisms of the Pasteur Institute in Paris under the accession number CNCM 1-1572 on 5 May 1995 by SOFAR S.p.A. (in short, DG® or *L. paracasei* DG® CNCM 1-1572 or (I.i)); said strain was initially named *Lactobacillus casei* DG® sub. *casei*; it was subsequently reclassified as *Lactobacillus paracasei* DG® CNCM 1-1572: it should be observed that it is still and exclusively the same bacterial strain irrespective of the name *Lactobacillus casei* DG® or *Lactobacillus paracasei* DG®;

(I.ii) an isolated bacterial strain belonging to the species *Lactobacillus paracasei* identified as *Lactobacillus paracasei* LPC-S01® and deposited at Deutsche Sammlung von Mikroorganismen und Zellkulturen GmbH (DSMZ) under the accession number DSM 26760, on 11 Jan. 2013 (date of filing of application at DSMZ 20 Nov. 2012; date of application of conversion of said original deposit to deposit according to the Budapest treaty 15 May 2017) by SOFAR S.p.A. (in short, LPC-S01® or *L. paracasei* LPC-S01® DSM 26760 or (I.ii));

(I.iii) an isolated bacterial strain belonging to the species *Bifidobacterium breve* identified as *Bifidobacterium breve* BbIBS01 and deposited at Deutsche Sammlung von Mikroorganismen und Zellkulturen GmbH (DSMZ) under deposit number DSM 33231 (deposited on 31 Jul. 2019 by Sofar S.p.A), (I.iv) an isolated bacterial strain belonging to the species *Bifidobacterium breve* identified as *Bifidobacterium breve* BbIBSO2 and deposited at Deutsche Sammlung von Mikroorganismen und Zellkulturen GmbH (DSMZ) under deposit number DSM 33232 (deposited on 31 Jul. 2019 by Sofar S.p.A), (I.v) an isolated bacterial strain belonging to the species *Bifidobacterium animalis* identified as *Bifidobacterium animalis* subsp. *lactis* BIIBSO1 and deposited at Deutsche Sammlung von Mikroorganismen und Zellkulturen GmbH (DSMZ) under deposit number DSM 33233 (deposited on 31 Jul. 2019 by Sofar S.p.A.), (I.vi) an isolated bacterial strain belonging to the species *Lactobacillus plantarum* identified as *Lactobacillus plantarum* LplBSO1 and deposited at Deutsche Sammlung von Mikroorganismen und Zellkulturen GmbH (DSMZ) under deposit number DSM 33234 (deposited on 31 Jul. 2019 by Sofar S.p.A.), (I.vii) an isolated bacterial strain belonging to the species *Bifidobacterium bifidum* identified as *Bifidobacterium bifidum* MIMBb23sg=BbfIBSO1 and deposited at Deutsche Sammlung von Mikroorganismen und Zellkulturen GmbH (DSMZ) under deposit number DSM 32708 on 4 Dec. 2017 by Sofar S.p.A., and a mixture thereof.

In a preferred embodiment of the invention, said (I) bacterial strain of the invention, or a derivative thereof, for use in said method for the treatment of a vitamin D deficiency and/or insufficiency is selected from the group comprising or, alternatively, consisting of at least: (Li) a strain of *Lactobacillus paracasei* DG® CNCM I-1572, (I.ii) a strain of *Lactobacillus paracasei* LPC-S01® DSM 26760, and a mixture thereof; preferably (Li) a strain of *Lactobacillus paracasei* DG® CNCM I-1572.

All the bacterial strains mentioned in the present invention were deposited according to the provisions pursuant to the Budapest treaty. The Depositing party of the bacterial strains described and/or claimed in the present patent application and the proprietor thereof express, from the outset, their consent to make available all the aforementioned strains for the whole duration of the patent.

Advantageously, said bacterial strain, or a derivative thereof, for use according to the present invention (even considered individually) (I.i-I.vii, preferably I.i and/or I.ii), is administered to a subject in need in a concentration (or amount) comprised in the range from $1\times10^6$ CFU/g or ml to $1\times10^{12}$ CFU/g or ml with respect to the daily dose, preferably from $1\times10^8$ CFU/g or ml to $1\times10^{10}$ CFU/g or ml, more preferably in a concentration comprised from about $1\times10^9$ CFU/g or ml to about $10\times10^9$ CFU/g or ml (AFU/g or ml) (CFU: Colony forming Unit).

In an embodiment, said bacterial strain of the invention (I.i-I.vii) or a derivative thereof, preferably (I.i) and/or (I.ii), facilitates the absorption, preferably at intestinal level, and/or the increase in the bioavailability of vitamin D levels in the serum (e.g. measured as the level of vitamin D3 in the form of $25(OH)_2D$) when administered to a subject, irrespective of whether said subject is also administered with one or more vitamins of group D.

In a preferred embodiment, said bacterial strain of the invention (I.i-I.vii) or a derivative thereof, preferably I.i and/or I.ii, facilitates the absorption, preferably at intestinal level, and/or the increase in the bioavailability of vitamin D levels in the serum (e.g. measured as the level of vitamin D3 in the form of $25(OH)_2D$) when administered associated/combined with vitamin D, preferably vitamin D3 and/or vitamin D2, more preferably vitamin D3 (cholecalciferol), wherein said administration of said at least one bacterial strain of the invention (I) and of vitamin D (II) is simultaneous or delayed over time, preferably simultaneous over time.

In the context of the present invention, administration "simultaneous over time" of (I) and (II) means that (I) and (II) are administered to the subject in need approximately at the same period of time of the day, in a single composition or through two separate compositions, or at a distance of a period of time comprised in the range from 5 minutes to 60 minutes.

In the context of the present invention, administration "delayed over time" of (I) and (II) means that (I) and (II) are administered to the subject in need at a distance of time from each other through two separate compositions for example at a distance of a period of time comprised in the range from 1 hour to 24 hours or from 2 days to 14 or 30 days. For example, said bacterial strain (I) may be administered daily while said at least one vitamin D (II) may be administered 1 or 2 times a week or 1 time every 2 weeks or 1 time every month.

Forming an object of the invention is a composition (in short, composition of the invention) comprising a mixture M (in short, mixture M of the invention) comprising or, alternatively, consisting of:

(I) at least one bacterial strain belonging to a species selected from *Lactobacillus paracasei*, *Lactobacillus plantarum*, *Bifidobacterium breve*, *Bifidobacterium animalis* subsp. *lactis*, *Bifidobacterium bifidum* and a mixture thereof (preferably the species *Lactobacillus paracasei*), preferably selected from the group of bacterial strains comprising or, alternatively, consisting of:

(I.i) *Lactobacillus paracasei* DG® CNCM I-1572 or a derivative thereof, (I.ii) *Lactobacillus paracasei* LPC-S01® DSM 26760 or a derivative thereof, (I.iii) *Bifidobacterium breve* BblBSO1 DSM 33231 or a derivative thereof, (I.iv) *Bifidobacterium breve* BblBSO2 DSM 33232 or a derivative thereof, (I.v) *Bifidobacterium animalis* subsp. *lactis* BIIBSO1 DSM 33233 or a derivative thereof, (I.vi) *Lactobacillus plantarum* LplBSO1 DSM 33234 or a derivative thereof, (I.vii) *Bifidobacterium bifidum* MIMBb23sg=BbflBSO1 or a derivative thereof, and—a mixture thereof; and (II) at least one vitamin D, preferably vitamin D3 (cholecalciferol) and/or of vitamin D2 (ergocalciferol), more preferably vitamin D3;

and, optionally, said composition comprises at least one acceptable pharmaceutical or food grade additive and/or excipient.

Examples of an embodiment of the composition of the invention, depending on the variation of the mixture M, are reported below.

Said mixture M of the invention may comprise or, alternatively, consist of:
- (I.i) a bacterial strain *Lactobacillus paracasei* DG® CNCM I-1572, or a derivative thereof; and
- (II) at least one vitamin D or D3, preferably in the form of cholecalciferol.

Said mixture M of the invention may comprise or, alternatively, consist of:
- (I.ii) a bacterial strain *Lactobacillus paracasei* LPC-S01® DSM 26760, or a derivative thereof; and
- (II) at least one vitamin D or D3, preferably in the form of cholecalciferol.

Said mixture M of the invention may comprise or, alternatively, consist of:
- (I.i) a bacterial strain *Lactobacillus paracasei* DG® CNCM I-1572 and (I.ii) a bacterial strain *Lactobacillus paracasei* LPC-S01 DSM 26760, or derivatives thereof; and
- (II) at least one vitamin D or D3, preferably in the form of cholecalciferol.

Said mixture M of the invention may comprise or, alternatively, consist of:
- (I.i) *Lactobacillus paracasei* DG® CNCM I-1572, or a derivative thereof, and furthermorea mixture of the bacterial strains comprising (I.iii) *Bifidobacterium breve* BblBSO1 DSM 33231, (I.iv) *Bifidobacterium breve* BblBSO2 DSM 33232, (I.v) *Bifidobacterium animalis* subsp. *lactis* BlIBSO1 DSM 33233, (I.vi) *Lactobacillus plantarum* LplBSO1 DSM 33234 and, optionally, (I.vii) *Bifidobacterium bifidum* MIMMb23sg=BbflBSO1 DSM 32708, or derivatives thereof; and
- (II) at least one vitamin D or D3, preferably in the form of cholecalciferol.

Said mixture M of the invention may comprise or, alternatively, consist of:
- (I.i) *Lactobacillus paracasei* DG® CNCM I-1572, or a derivative thereof, and (I.ii) *Lactobacillus paracasei* LPC-S01 DSM 26760, or a derivative thereof, and furthermore a mixture of the bacterial strains comprising
- (I.iii) *Bifidobacterium breve* BblBS01 DSM 33231, (I.iv) *Bifidobacterium breve* BbIBS02 DSM 33232, (I.v) *Bifidobacterium animalis* subsp. *lactis* BlIBSO1 DSM 33233, (I.vi) *Lactobacillus plantarum* LplBS01 DSM 33234 and, optionally, (I.vii) *Bifidobacterium bifidum* MIMMb23sg=BbflBSO1 DSM 32708, or derivatives thereof; and
- (II) at least one vitamin D or D3, preferably in the form of cholecalciferol.

Said mixture M of the invention may comprise or, alternatively, consist of:
- (I.i) *Lactobacillus paracasei* DG® CNCM I-1572, or a derivative thereof, and furthermore at least one bacterial strain (or a derivative thereof) selected from: (I.iii) *Bifidobacterium breve* BblBS01 DSM 33231, (I.iv) *Bifidobacterium breve* BbIBS02 DSM 33232, (I.v) *Bifidobacterium animalis* subsp. *lactis* BlIBSO1 DSM 33233, (I.vi) *Lactobacillus plantarum* LplBS01 DSM 33234, (I.vii) *Bifidobacterium bifidum* MIMMb23sg=BbflBS01 DSM 32708 and a mixture thereof; and
- (II) at least one vitamin D or D3, preferably in the form of cholecalciferol.

Said mixture M of the invention may comprise or, alternatively, consist of:
- (I.i) *Lactobacillus paracasei* DG® CNCM I-1572, or a derivative thereof, and (I.ii) *Lactobacillus paracasei* LPC-S01 DSM 26760, or a derivative thereof, and furthermore at least one bacterial strain (or a derivative thereof) selected from: (I.iii) *Bifidobacterium breve* BblBS01 DSM 33231, (I.iv) *Bifidobacterium breve* BbIBS02 DSM 33232, (I.v) *Bifidobacterium animalis* subsp. *lactis* BIIBSO1 DSM 33233, (I.vi) *Lactobacillus plantarum* LplBS01 DSM 33234, (I.vii) *Bifidobacterium bifidum* MIMMb23sg=BbflBS01 DSM 32708 and a mixture thereof (or derivatives thereof); and
- (II) at least one vitamin D or D3, preferably in the form of cholecalciferol.

Advantageously, in said composition of the invention (I) and (II) and optionally additives, preferably (I.i) and/or (I.ii) and/or vitamin D3, said at least one bacterial strain, preferably of the species *Lactobacillus paracasei*, is present in a concentration comprised from $1\times10^6$ CFU/g or ml to $1\times10^{12}$ CFU/g or ml of composition (amount referring to each bacterial strain present in the composition); preferably in a concentration comprised from $1\times10^8$ CFU/g or ml to $1\times10^{10}$ CFU/g or ml of composition, more preferably in a concentration of about $1\times10^9$ CFU/g or ml (or AFU/g or ml) of composition (CFU: Colony Forming Unit). The compositions according to the present invention may comprise two or three or four or five or six or seven different bacterial strains according to the present invention (such as, the strains (I.i), (I.ii), (I.iii), (I.iv), (I.v), (I.vi) and (I.vii)); preferably said bacterial strains are comprised in the composition of the present invention in a CFU ratio of about 1:1, 1:1:1, 1:1:1:1, 1:1:1:1:1, 1:1:1:1:1:1 or 1:1:1:1:1:1:1.

Advantageously, in said composition of the invention comprising (I) and (II), preferably (I.i) and/or (I.ii) and/or vitamin D3, said vitamin D (II) is present in an amount comprised in the range from 40 IU to $1.5\times10^6$ UI, preferably from 500 IU to $1\times10^6$ UI, more preferably from 1,000 IU to $1\times10^5$ IU or from 1,000 IU to 3,000 UI, for example about 1,600-2,000 UI.

Said amount of vitamin D is expressed in "IU", that is international unit, 1 IU of vitamin D equals 0.025 μg and, thus, 1 μg equals to 40 IU.

Preferably, said (I) bacterial strains of the present invention (I.i-I.vii) or derivatives thereof, both "as such" or "per s6" and comprised in the composition of the invention, preferably (I.i) and (I.ii), are viable bacterial strains (probiotics), such as for example viable bacterial strains present in probiotic products or in Live Biotherapeutic Products (in short, LBP, such as pharmaceutical products comprising viable bacterial strains).

"Probiotics" are defined as live microorganisms (i.e. bacterial strains) which, when administered in adequate amounts, confer health benefits on the host (FAO and WHO definition).

In the context of the present invention, the expression "derivative" of a bacterial strain of the present invention is used to indicate the tyndallized or inactivated bacterial strain or lysates or extracts of the bacterial strain (paraprobiotics), or any derivative and/or component of the bacterial strain, preferably exopolysaccharide, parietal fraction, metabolites or metabolic bioproducts generated by the bacterial strain (postbiotics) and/or any other product derived from the bacterial strain. Preferably, the expression "derivative" of the bacterial strains of the present invention is used to indicate the tyndalized or inactivated bacterial strain.

In other words, the expression "derivative" of a probiotic viable bacterial strain, in the context of the present invention, is substantially used to indicate a paraprobiotic or a postbiotic.

In the context of the present invention, the expression "paraprobiotics" (Taverniti et al., "*The immunomodulatory properties of probiotic microorganisms beyond their viability (ghost probiotics: proposal of paraprobiotic concept)*" Genes Nutr (2011) 6:261-274) is used to indicate bacterial cells (intact or broken), or crude cell extracts which, when administered (through the oral or topical route) in an adequate amount, confer a benefit to the health of the host (similarly to the viable and culturable bacterial strains from which they derive). Examples of paraprobiotics are heat inactivated bacterial strains (for example tyndallized bacterial strains), sonication (ultrasonic) or lysates of bacterial strains or extracts of bacterial strains.

In the context of the present invention, the term "postbiotics" is used to indicate any substance released or produced by means of the metabolic activity of the probiotic viable bacteria strain, wherein said postbiotics, when administered (through the oral or topical rute) in an adequate amount, confer a benefit to the health of the host (similarly to the viable and culturable bacterial strains from which they derive). Examples of postbiotics are exopolysaccharides, parietal fractions, metabolites or metabolic bioproducts.

The composition of the invention, comprising said mixture M comprising or, alternatively, consisting of (I) and (II), preferably (I.i) and/or (I.ii) and/or vitamin D3, further comprises, optionally, said at least one pharmaceutical or food grade additive and/or excipient, i.e. a substance devoid of therapeutic activity suitable for pharmaceutical or food use. In the context of the present invention the additives and/or excipients acceptable for pharmaceutical or food use comprise all ancillary substances known to the man skilled in the art for the preparation of compositions in solid, semi-solid or liquid form, such as for example diluents, solvents (including water, glycerine, ethyl alcohol), solubilisers, acidifiers, thickeners, sweeteners, flavour-enhancement agents, colouring agents, sweetening agents lubricants, surfactants, preservatives, stabilisers, pH stabilising buffers and mixtures thereof, for example citric acid, potassium sorbate and/or sodium benzoate.

According to an aspect, besides said mixture M of the invention comprising (I) and (II), the composition of the present invention may comprise at least one further active component selected from the group comprising or, alternatively, consisting of other viable and/or paraprobiotic and/or postbiotic and/or lysed and/or tyndallized and/or inactivated bacterial strains, enzymes, direct or indirect antacid action substances, prebiotics, probiotics belonging to the families of yeasts and bacteria, immunostimulants, anti-inflammatory substances, antidiarrheal substances, nutrients, vitamins, preferably of the group A, B, C, E, organic and/or inorganic salts of magnesium, sodium, potassium, chlorine, selenium, zinc, melatonin, plant extracts (botanicals), such as for example valerian, passion flower, lemon balm, hawthorn, chamomile and hops, antioxidants, such as for example glutathione, polyphenols such as resveratrol and trans-resveratrol, coenzyme Q10, astaxanthin, lycopene, anti-radical agents, substances acting on intestinal permeability, PEA (palmitoylethanolamide), substances acting on membrane integrity, glycosaminoglycans (such as preferably hyaluronic acid and chondroitin sulfate), collagen.

For example, the composition of the invention comprises said mixture M comprising or, alternatively, consisting of (I) and (II) and, optionally, additives, preferably (I.i) and/or (I.ii) and/or vitamin D3, may further comprise at least one prebiotic, preferably selected from: inulin, fructo-oligosaccharides (FOS), galacto-oligosaccharides (GOS) and a mixture thereof.

Forming an object of the invention is said composition of the invention comprising (I) and (II) according to any embodiment of the present invention, preferably (I.i) and/or (I.ii) and/or vitamin D3, for use as medicament.

Forming an object of the invention is said composition of the invention comprising (I) and (II) according to any embodiment of the present invention, preferably (I.i) and/or (I.ii) and/or vitamin D3, for use in the preventive and/or curative treatment of a vitamin D deficiency and/or insufficiency (or hypovitaminosis D) and/or of a disease, symptom and/or disorder associated with said vitamin D deficiency, preferably vitamin D2 and/or vitamin D3, more preferably vitamin D3.

In the context of the present invention, increasing the absorption and/or bioavailability of vitamin D is used to indicate increasing the blood levels (or serum levels) of vitamin D in the subject to whom the bacterial strains for use of the invention or the composition of the invention are administered.

Preferably, in the context of the present invention, the absorption and/or bioavailability of vitamin D are evaluated as blood levels of vitamin D3, in particular vitamin D3 in the form $25(OH)_2D$.

The evaluation of the blood levels of vitamin D3 in the form $25(OH)_2D$ is the most accurate method to date for determining the reserve of vitamin D in the organism. Blood levels of vitamin D3 are normally expressed in nmol/litre or ng/ml, such as ng of vitamin D3 in the form $25(OH)_2D$ on ml of serum. Blood levels of vitamin D are evaluated using analytical methods and equipment known to an expert technician. For example, said analytical methods are indirect methods or direct methods. Indirect methods are, for example, immunochemical or immunoenzymatic methods, such as ELISA (enzyme-linked immunosorbent assay) and radioimmunological assay (RIA) method. The direct methods are for example high-performance liquid chromatography (HPLC), or mass spectrometry techniques, such as for example liquid chromatography combined with mass spectrometry (LC-MS), liquid chromatography combined with tandem mass spectrometry (LC-MS/MS) and gas chromatography combined with mass spectrometry GC-MS.

Preferably, according to the present invention, a healthy human subject has blood values of $25(OH)_2D$ preferably comprised from 30 ng/ml to 80 ng/ml, while a human subject with insufficient values has blood values of $25(OH)_2D$ lower than 30 ng/ml, preferably comprised between 10 and 30 ng/ml, while a subject with $25(OH)_2D$ deficiency has values lower than 10 ng/ml (ng of vitamin D3 in the form $25(OH)_2D$ on ml of serum).

In an embodiment, said (I) bacterial strain for use of the invention (I.i-I.vii or derivatives thereof), preferably (I.i) and/or (I.ii), and/or said composition of the invention comprising (I) and (II), preferably (I.i) and/or (I.ii) and/or vitamin D3, allow the treatment of diseases, symptoms and/or disorders associated with a vitamin D deficiency and/or insufficiency, preferably vitamin D3 and/or D2, selected from: rickets, fragile bones, bone deformation, osteoporosis, osteomalacia, bone pain, joint pain, bone fragility, hypocalcaemia, hypophosphatemia, bone abnormalities due to demineralisation defects.

In an embodiment, said (I) bacterial strain for use of the invention (I.i-I.vii or derivatives thereof), preferably (I.i) and/or (I.ii), or said composition of the invention comprising (I) and (II), preferably (I.i) and/or (I.ii) and/or vitamin D3, allow the treatment of diseases, symptoms and/or disorders associated with a vitamin D deficiency, preferably vitamin D3 and/or D2, selected from: muscle weakness, difficulty concentrating, recurrent fatigue, cognitive disorders, psychological and emotional disorders, secondary hyperparathyroidism, sweating hands.

In an embodiment, said (I) bacterial strain for use of the invention (I.i-I.vii or derivatives thereof), preferably (I.i) and/or (I.ii), or said composition of the invention comprising (I) and (II), preferably (I.i) and/or (I.ii) and/or vitamin D3, allow the treatment of diseases, symptoms and/or disorders associated with a vitamin D deficiency, preferably vitamin D3 and/or D2, selected from: cardiovascular disorders or diseases selected from: heart failure, myocardial infarction, sudden cardiac death, stroke, atrial fibrillation and peripheral vascular disease; obesity, insulin resistance, hypertension and diabetes; diabetes, dyslipidaemia, metabolic syndrome, hypertension, renal dysfunction, acute and/or chronic inflammation of the gastrointestinal tract, changes in the immune system, cancer (preferably colon cancer, breast cancer, skin cancer, lung cancer and prostate cancer), autoimmune diseases, seasonal depression and other mental disorders, Alzheimer's disease, multiple sclerosis, infections and/or inflammations of the respiratory system (for example from Coronavirus).

Low levels of vitamin D are associated with an increase in inflammatory cytokines and a significantly increased risk of pneumonia and viral infections of the upper respiratory tract. Vitamin D deficiency is associated with an increase in thrombotic episodes, which are frequently observed in SARS-CoV-2 infections (COVID-19 disease).

Said (I) bacterial strains of the present invention (I.i-I.vii or derivatives thereof), preferably (I.i) and (I.ii), and said composition of the invention comprising (I) and (II), preferably comprising (i.i) and/or (I.ii) and/or vitamin D3, are for use as defined in the present invention:
  in subjects with vitamin D deficiency and/or insufficiency, preferably vitamin D3 and/or D2, or,
  in paediatric subjects (from about 0 years to 3 years and/or from 3 years to 12 years), preferably paediatric subjects with vitamin D deficiency and/or insufficiency, preferably vitamin D3 and/or D2, or,
  in pregnant subjects, preferably pregnant subjects with vitamin D deficiency and/or insufficiency, preferably vitamin D3 and/or D2,
  in subjects to whom therapies which could lead to a decrease in the absorption of fat-soluble vitamins, such as vitamin D, preferably vitamin D3 and/or vitamin D2, more preferably vitamin D3 have been administered, such as for example, subjects to whom therapies have been administered to reduce blood cholesterol levels leading to a decrease in sterol absorption, including fat-soluble vitamins, such as vitamin D.

Said (I) bacterial strain for use of the invention and/or said compositions of the invention comprising (I) and (II), may be formulated in solid form, such as tablet, chewable tablet, capsule, lozenge, granules, oral soluble granules, pastilles, flakes or powder, sachets, bars, in semi-solid form, such as soft-gel, cream, or in liquid form, such as solution, suspension, dispersion, emulsion or syrup, or in a food such as yoghurt, cheese, fruit juice.

Said (I) bacterial strain for use of the invention and/or said compositions of the invention comprising (I) and (II), may be formulated for oral (or gastroenteric), sublingual (or buccal), transmucosal, rectal, cutaneous, inhalation, (or nasal or oral), parenteral use (or administration), advantageously, it is formulated for oral use.

The composition of the invention, comprising said mixture M comprising or, alternatively, consisting of (I) and (II), preferably (I.i) and/or (I.ii) and/or vitamin D3, may be a pharmaceutical composition (or Live Biotherapeutic Products), a medical device composition, a dietary supplement, a food or novel food or probiotic, a food for special medical purposes composition or a cosmetic composition for example for skin application.

In the context of the present invention, the expression "medical device" is used in the meaning according to the Italian Legislative Decree n° 46 dated 24 Feb. 1997 or according to the new Medical Device Regulation (EU) 2017/745 (MDR).

Said (I) bacterial strain for use of the invention (I.i-I.vii or derivatives thereof), preferably (I.i) and/or (I.ii), or said composition of the invention comprising (I) and (II), preferably (I.i) and/or (I.ii) and/or vitamin D3, may further be for use as medicament as adjuvant of further therapeutic approaches, preferably of pharmacological or food type, aimed at treating a vitamin D deficiency, preferably vitamin D3 and/or D2, and diseases, symptoms and/or disorders associated therewith.

Forming an object of the present invention is a method for the preventive or curative treatment of a vitamin D deficiency and/or insufficiency, preferably vitamin D3 e/o D2, and diseases, symptoms and/or disorders associated therewith which provides for the administration of a minimum curative amount (or therapeutically effective amount, according to the knowledge of a physician) at least one strain of the present invention (I.i-I.vii), preferably (I.i) and/or (I.ii), or of the composition of the invention comprising (I) and (II), preferably (I.i) and/or (I.ii) and/or vitamin D3, to a subject in need.

For the sake clarity, in order to achieve the object of the present invention, the components (or active components) (I) and (II) of the mixture (M) of the invention, such as at least one bacterial strain (I), may also be administered simultaneously or separately (preferably within a time interval ranging from 5 minutes to 60 minutes) and in any order; preferably, (I) and (II) are administered to a subject simultaneously, even more preferably in a single composition to obtain a more rapid effect and for ease of administration. When the components (I) and (II) of the mixture (M) of the invention, are administered in a single composition, said single composition corresponds to the composition of the present invention.

Unless specified otherwise, the expression composition or mixture or other comprising a component at an amount "comprised in a range from x to y" is used to indicate that said component may be present in the composition or mixture or other at all the amounts present in said range, even though not specified, extremes of the range comprised.

As illustrated in the experimental part, the administration of vitamin D and a bacterial strain of the invention (I,i-I.vii or derivatives thereof), preferably (I.i) *Lactobacillus paracasei* DG® CNCM 1-1572 and/or (I.ii) *Lactobacillus paracasei* LPC-S01 DSM 26760, such as bacterial strains belonging to the species *Lactobacillus paracasei*, to a subject increase the vitamin D serum levels in said subject in a synergistic or additive/enhanced fashion.

Furthermore, said administration of vitamin D and bacterial strains is capable of modulating the expression of the vitamin D receptor, VDR, at the intestinal level.

Embodiments of the present invention (FR-An) are reported below: FR-A1. A bacterial strain for use in a method for the preventive or curative treatment of a vitamin D deficiency and/or insufficiency (or hypovitaminosis D) and/or of a disease, symptom and/or disorder associated with said vitamin D deficiency, wherein said bacterial strain is selected from the group comprising or, alternatively, consisting of:
- a strain of *Lactobacillus paracasei* DG® CNCM 1-1572
- a strain of *Lactobacillus paracasei* LPC-S01 DSM 26760,
- a strain of *Bifidobacterium breve* BblBSO1 DSM 33231,
- a strain of *Bifidobacterium breve* BblBSO2 DSM 33232,
- a strain of *Bifidobacterium animalis* subsp. *lactis* BlIBSO1 DSM 33233,
- a strain of *Lactobacillus plantarum* LplBSO1 DSM 33234,
- a strain of *Bifidobacterium bifidum* BbflBSO1 DSM 32708, and a mixture thereof.

FR-A2. The bacterial strain for use according to FR-A1, wherein said vitamin D deficiency is a vitamin D3 (cholecalciferol) and/or vitamin D2 (ergocalciferol), preferably vitamin D3, deficiency and/or insufficiency.

FR-A3. The bacterial strain for use according to FR-A1 or 2, wherein said bacterial strain is administered associated/combined with vitamin D, preferably vitamin D3, wherein said administration of said bacterial strain and of vitamin D is simultaneous or delayed over time.

FR-A4. A composition comprising a mixture M comprising or, alternatively, consisting of:
- at least one vitamin D,
- at least one bacterial strain selected from the group comprising or, alternatively, consisting of:
- a strain of *Lactobacillus paracasei* DG® CNCM 1-1572
- a strain of *Lactobacillus paracasei* LPC-S01 DSM 26760,
- a strain of *Bifidobacterium breve* BblBS01 DSM 33231,
- a strain of *Bifidobacterium breve* BblBS02 DSM 33232,
- a strain of *Bifidobacterium animalis* subsp. *lactis* BlIBSO1 DSM 33233,
- a strain of *Lactobacillus plantarum* LplBS01 DSM 33234,
- a strain of *Bifidobacterium bifidum* BbflBS01 DSM 32708, and a mixture thereof;

and, optionally, said composition comprises
- at least one acceptable pharmaceutical or food grade additive and/or excipient.

FR-A5. The composition according to FR-A4, wherein said at least one vitamin D is vitamin D3 (cholecalciferol) and/or vitamin D2 (ergocalciferol), preferably vitamin D3.

FR-A6. The composition for use according to FR-A5, wherein said mixture M comprises or, alternatively, consists of:
- a bacterial strain *Lactobacillus paracasei* DG® CNCM I-1572 and/or a bacterial strain *Lactobacillus paracasei* LPC-S01 DSM 26760; and
- vitamin D3 (cholecalciferol).

FR-A7. The composition for use according to FR-A5, wherein said mixture M comprises or, alternatively, consists of:
- a bacterial strain *Lactobacillus paracasei* DG® CNCM I-1572 and/or bacterial strain *Lactobacillus paracasei* LPC-S01 DSM 26760, and furthermore at least one bacterial strain selected from: *Bifidobacterium breve* BblBS01 DSM 33231, *Bifidobacterium breve* BblBS02 DSM 33232, *Bifidobacterium animalis* subsp. *lactis* BlIBSO1 DSM 33233, *Lactobacillus plantarum* LplBS01 DSM 33234, *Bifidobacterium bifidum* BbflBS01 DSM 32708 and a mixture thereof; and
- vitamin D3 (cholecalciferol).

FR-A8. The composition according to any one of FR-A4-7, wherein said composition is for use as medicament.

FR-A9. The composition for use according to FR-A8, wherein said composition is for use in the preventive and/or curative treatment of a vitamin D deficiency and/or of a disease, symptom and/or disorder associated with said vitamin D deficiency.

FR-A10. The bacterial strain for use according to any one of FR-A1 or the composition for use according to FR-9, wherein said disease, symptom and/or disorder is selected from among: cardiovascular disorders or diseases selected from: heart failure, myocardial infarction, sudden cardiac death, stroke, atrial fibrillation and peripheral vascular disease; obesity, insulin resistance, hypertension and diabetes; diabetes, dyslipidaemia, metabolic syndrome, hypertension, renal dysfunction, acute and/or chronic inflammation of the gastrointestinal tract, changes in the immune system, cancer, colon cancer, breast cancer, skin cancer, lung cancer and prostate cancer, autoimmune diseases, seasonal depression and other mental disorders, Alzheimer's disease, multiple sclerosis.

Further embodiments of the present invention (FR-Bn) are reported below:

FR-B1. A bacterial strain for use in a method for the preventive or curative treatment of a vitamin D deficiency and/or insufficiency (or hypovitaminosis D) and/or of a disease, symptom and/or disorder associated with said vitamin D deficiency, preferably vitamin D3,
wherein said bacterial strain belongs to the species *Lactobacillus paracasei*, reclassified *Lacticaseibacillus paracasei*.

FR-B2. The bacterial strain for use according to FR-B1, wherein said bacterial strain belongs to the species *Lactobacillus paracasei* is selected from the group comprising or, alternatively, consisting of:
- a bacterial strain belonging to the species *Lactobacillus paracasei* identified as *Lactobacillus paracasei* DG® and deposited at the National Collection of Cultures of Microorganisms of the Pasteur Institute in Paris under the accession number CNCM I-1572 and name *Lactobacillus casei* DG® sub. *casei*,
- a bacterial strain belonging to the species *Lactobacillus paracasei* identified as *Lactobacillus paracasei* LPC-S01® and deposited at Deutsche Sammlung von Mikroorganismen und Zellkulturen GmbH (DSMZ) under the accession number DSM 26760, and a mixture thereof.

FR-B3. The bacterial strain for use according to FR-B1 or 2, wherein said vitamin D deficiency is a vitamin D3 (cholecalciferol) and/or vitamin D2 (ergocalciferol), preferably vitamin D3, deficiency and/or insufficiency.

FR-B4. The bacterial strain for use according to any one of FR-B1-3, wherein said bacterial strain is administered associated/combined with vitamin D, preferably vitamin D3, wherein said administration of said bacterial strain and of vitamin D is simultaneous or delayed over time.

FR-B5. A composition comprising
a mixture M comprising or, alternatively, consisting of:
- at least one vitamin D, and
- at least one bacterial strain belonging to the species *Lactobacillus paracasei*, and, optionally, said composition comprises
- at least one acceptable pharmaceutical or food grade additive and/or excipient.

FR-B6. A composition according to FR-B5, wherein said at least one bacterial strain belonging to the species *Lactobacillus paracasei* is selected from the group comprising or, alternatively, consisting of:

a bacterial strain belonging to the species *Lactobacillus paracasei* identified as *Lactobacillus paracasei* DG® and deposited at the National Collection of Cultures of Microorganisms of the Pasteur Institute in Paris under the accession number CNCM I-1572 and name *Lactobacillus casei* DG® sub. *casei*, a bacterial strain belonging to the species *Lactobacillus paracasei* identified as *Lactobacillus paracasei* LPC-S01® and deposited at Deutsche Sammlung von Mikroorganismen und Zellkulturen GmbH (DSMZ) under the accession number DSM 26760, and a mixture thereof.

FR-B7. The composition according to FR-B5 or 6, wherein said at least one vitamin D is a vitamin D3 (cholecalciferol) and/or a vitamin D2 (ergocalciferol), preferably vitamin D3.

FR-B8. The composition according to FR-B6 or 7, wherein said mixture M comprises or, alternatively, consists of:

a bacterial strain *Lactobacillus paracasei* DG® CNCM 1-1572 and/or a bacterial strain *Lactobacillus paracasei* LPC-S01® DSM 26760; and at least one vitamin D, preferably a vitamin D3 (cholecalciferol).

FR-B9. The composition according to any one of FR-B6-8, wherein said mixture M comprises or, alternatively, consists of:

a bacterial strain *Lactobacillus paracasei* DG® CNCM 1-1572 and/or a bacterial strain *Lactobacillus paracasei* LPC-S01® DSM 26760, and further at least one bacterial strain selected from the group consisting of:

a bacterial strain belonging to the species *Bifidobacterium breve* identified as *Bifidobacterium breve* BblBSO1 and deposited at Deutsche Sammlung von Mikroorganismen und Zellkulturen GmbH (DSMZ) under deposit number DSM 33231, a bacterial strain belonging to the species *Bifidobacterium breve* identified as *Bifidobacterium breve* BbIBSO2 and deposited at Deutsche Sammlung von Mikroorganismen und Zellkulturen GmbH (DSMZ) under deposit number DSM 33232, a bacterial strain belonging to the species *Bifidobacterium animalis* identified as *Bifidobacterium animalis* subsp. *lactis* BIIBSO1 and deposited at Deutsche Sammlung von Mikroorganismen und Zellkulturen GmbH (DSMZ) under deposit number DSM 33233, a bacterial strain belonging to the species *Lactobacillus plantarum* identified as *Lactobacillus plantarum* LplBSO1 and deposited at Deutsche Sammlung von Mikroorganismen und Zellkulturen GmbH (DSMZ) under deposit number DSM 33234, a bacterial strain belonging to the species *Bifidobacterium bifidum* identified as *Bifidobacterium bifidum* BbflBSO1 and deposited at Deutsche Sammlung von Mikroorganismen und Zellkulturen GmbH (DSMZ) under deposit number DSM 32708 and a mixture thereof; and at least one vitamin D, preferably a vitamin D3 (cholecalciferol).

FR-B10. The composition according to any one of FR-B5-9 for use as medicament.

FR-B11. The composition for use according to FR-B10, wherein said composition is for use in the preventive and/or curative treatment of a vitamin D deficiency and/or of a disease, symptom and/or disorder associated with said vitamin D deficiency in a subject in need;

preferably wherein said vitamin D is a vitamin D3 (cholecalciferol) and/or a vitamin D2 (ergocalciferol), more preferably vitamin D3.

FR-B12. The bacterial strain for use according to any one of FR-B1-4 or the composition for use according to FR-B10 or 11, wherein said disease, symptom and/or disorder is selected from among: cardiovascular disorders or diseases selected from: heart failure, myocardial infarction, sudden cardiac death, stroke, atrial fibrillation and peripheral vascular disease; obesity, insulin resistance, hypertension and diabetes; diabetes, dyslipidaemia, metabolic syndrome, hypertension, renal dysfunction, acute and/or chronic inflammation of the gastrointestinal tract, changes in the immune system, cancer, colon cancer, breast cancer, skin cancer, lung cancer and prostate cancer, autoimmune diseases, seasonal depression and other mental disorders, Alzheimer's disease, multiple sclerosis.

FR-B13. The bacterial strain for use according to any one of FR-B1-4 or the composition for use according to FR-B10 or 11, wherein said disease, symptom and/or disorder is selected from: rickets, fragile bones, bone deformation, osteoporosis, osteomalacia, bone pain, joint pain, bone fragility, hypocalcaemia, hypophosphatemia, bone abnormalities due to demineralisation defects.

FR-B14. The bacterial strain for use according to any one of FR-B1-4 or the composition for use according to FR-B10 or 11, wherein said disease, symptom and/or disorder is selected from: muscle weakness, difficulty concentrating, recurrent fatigue, cognitive disorders, psychological and emotional disorders, secondary hyperparathyroidism, sweating hands.

FR-B15. The bacterial strain for use according to any one of the preceding FR-Bn or the composition for use according to any one of the preceding FR-Bn, wherein said subjects in need are paediatric subjects.

Experimental Part (A.1.) In Vitro Study

1. PURPOSE

Given that the absorption of vitamin D seems to resemble that of lipids, a better emulsification in the intestine could facilitate the permeation of vitamin D through the membrane of enterocytes. At the same time, it was assumed that a microorganism with cholecalciferol (vitamin D3) dissolution properties may potentially lead to increased vitamin D serum levels. To this end, four probiotic strains were subjected to screening for their ability to create a stable suspension of vitamin D3 in water: *Lactobacillus paracasei* DG® CNCM I-1572 (rinominato *Lacticaseibacillus paracasei* DG® CNCM I-1572), *Lactobacillus rhamnosus* GG (rinominato *Lacticaseibacillus paracasei* GG), *Lactobacillus reuteri* DSM 17938 (rinominato *Limosilactobacillus reuteri* DSM 17938) and *Lactobacillus acidophilus* LA5.

2. MATERIALS AND METHODS 2.1 Bacterial Strains and Culture Conditions

Four bacterial strains belonging to the genus *Lactobacillus* (family Lactobacillaceae) were studied: *Lactobacillus paracasei* CNCM I-1572 (*L. casei* DG®; Enterolactis*, SOFAR S.p.A.), *Lactobacillus rhamnosus* ATCC 53103 (ceppo GG), *Lactobacillus reuteri* DSM 17938, *Lactobacillus acidophilus* DSM13241 (strain LA5).

All strains were cultured in de Man Rogosa Sharpe broth (MRS; Difco) at 37° C. overnight.

2.2 In Vitro Evaluation of the Emulsification of Vitamin D3 by Probiotic Bacterial Cells The cell pellet was recovered from the broth culture by means of centrifugation, washed twice with a phosphate buffer saline solution (PBS; pH 7.3) and resuspended in PBS at an $OD_{600\,nm}=5$. Thus, 100 μl di DIBASE (50,000 IU/2.5 ml of cholecalciferol in olive oil, Abiogen Pharma, Italy), corresponding to 2000 IU (2.5 μg) of cholecalciferol, were dispersed in 1 ml of bacterial suspension and incubated under magnetic stirring (500 rpm) for 45 minutes. Subsequently, after mild centrifugation (2000 rpm, 2 min), 400 μl of the aqueous phase placed under the oily phase were taken using the needle of a sterile syringe.

Subsequently, cholecalciferol (vitamin D3) was extracted from aqueous samples using the following method: 400 μl of methanol were added to the sample and the mixture was extracted once with two volumes of hexane. The hexane phase obtained after centrifugation (13000 rpm, 3 min) was evaporated to dryness under nitrogen and the dried residue was dissolved in 150 μl of HPLC mobile phase. A volume of 100 μl was used for HPLC analysis.

2.3 HPLC Analysis

Cholecalciferol (vitamin D3) was separated using a Poroshell 120 EC-C18 4.6×100 mm, 2.7 μm column in an HPLC system comprising a separation module Agilent (1260 infinity II pumps with automatic sampler) and 1260 infinity II variable wavelength detector (detection at 265 nm for vitamin D). The chromatographic protocol was according to Goncalves et al. [Molecular nutrition & food research 2011, 55 Suppl 2, S303-311]. In short, the mobile phase was 60% acetonitrile, 38% methanol and 2% water. The flow rate was 1 ml/minute and the column was maintained at a constant temperature (40° C.). Cholecalciferol was identified by means of spectral analysis and/or retention and co-injection time with respect to the pure standard. Quantification was conducted using HPLC Open Lab Agilent software comparing the peak area with the standard reference curve.

2.6 Statistical Analysis

The data are reported as mean±standard deviation (mean±SD). Statistical analysis was conducted using the unpaired Student's t-test. Differences were deemed significant at $p<0.05$.

3. RESULTS

Figure 4:
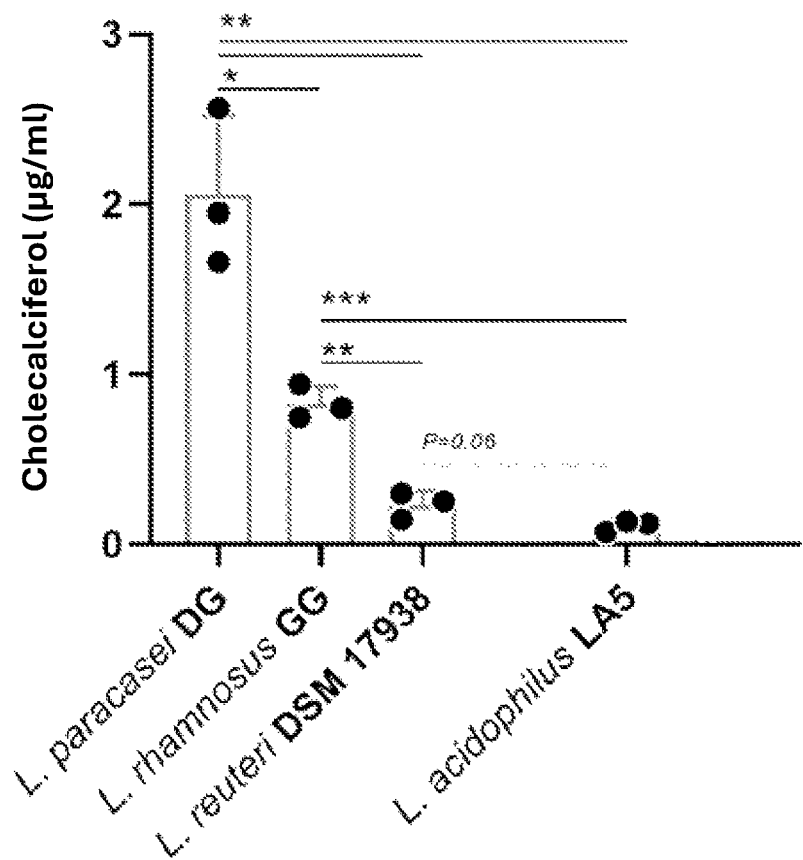
FIG. 4 is a schematic representation of the emulsification properties of vitamin D (cholecalciferol) with the probiotic bacterial strains belonging to the genus *Lactobacillus*, reported in the in vitro experimental part (A.1).

Four lactic acid bacterial strains were tested for their potential ability to create a stable suspension of vitamin D in water. To this end, bacterial cells in PBS were mixed with a solution of vitamin D3 in refined olive oil (10:1 v/v). Then, an aliquot of the aqueous phase was analysed by means of HPLC to quantify the dissolution of cholecalciferol in water. The results obtained revealed a significant increase in cholecalciferol in the aqueous phase for the strain *L. paracasei* DG® CNCM I-1572, which showed greater ability to effectively emulsify cholecalciferol in water with respect to the other strains (FIG. 4). The statistic is based on unpaired Student's-t-test (n=3; * $p<0.001$;  $p<0.01$; * $p<0.05$).

4. CONCLUSION

Several species of the family Lactobacillaceae, which are dominant members of the microbiota of numerous foods, have shown to produce biosurfactants, that is amphiphilic molecules of different chemical nature (for example glycolipids, phospholipids, lipopeptides and other polymers) which may have detergent, emulsifying, foaming or dispersing activity. It can therefore be assumed that once in the intestine, biosurfactant producing microorganisms can contribute to the emulsification of vitamin D, facilitating contact thereof with the epithelium and, therefore, the absorption thereof. The production of biosurfactant is also carried out by microorganisms commonly used as probiotics, in particular members of the family Lactobacillaceae such as *L. casei/paracasei*, *L. rhamnosus* and *L. acidophilus*. In this study, four Lactobacillaceae strains with well documented probiotic properties were selected for the in vitro test their ability to dissolve cholecalciferol in water.

The experiment conducted revealed a significant difference between the tested bacteria, and the strain *L. paracasei* DG® CNCM I-1572, which significantly increased the amount of cholecalciferol in the aqueous phase. In particular, the ability of the strain *L. paracasei* DG® CNCM I-1572 was approximately twice that of *L. rhamnosus* GG.

The molecular determinant of the emulsifying ability of the strain *L paracasei* DG® CNCM I-1572 is not known, but we can assume that a significant contribution can be provided by the exclusive rhamnose-rich hetero-exopolysaccharides (HePS) which *L. paracasei* DG® CNCM I-1572 accumulates on the outer cell surface. As a matter of fact, the bacterial macromolecules of HePS can exert efficient emulsifying properties toward various hydrophobic molecules such as crude oils and hydrocarbons.

(A.2) IN VIVO STUDY

In vivo study in murine model for the evaluation of the effect of a bacterial strain of the species *Lactobacillus paracasei* on the bioavailability of vitamin D.

Preparation of Animals and Test Material

Mice (8-week old adult male Cd1) were enclosure-adapted and fed on a conventional diet. Mice were housed in cages and kept in a temperature-controlled environment (22±2° C.) with a 12-hour light/dark cycle with food for regular chow and tap water supplied ad libitum. After one week of acclimatisation, the animals were then randomly divided into 6 experimental groups of 6 mice each and each group was randomly assigned to one of the scheduled treatments (Table 1).

TABLE 1

| Treatment groups | |
|---|---|
| Group 1 | No treatment |
| Group 2 | One shot of Vitamin D3 |
| Group 3 | Supplementation with *L. paracasei* DG ® ($10^8$ cfu/day) for one week |
| Group 4 | Supplementation with *L. paracasei* DG ® ($10^8$ cfu/day) for one week followed by one shot of Vitamin D3 |
| Group 5 | One-week supplementation with *L. paracasei* DG ® ($10^8$ cfu/day) and Vitamin D3 |
| Group 6 | One-week supplementation with Vitamin D3 |

The strain *Lactobacillus paracasei* DG® CNCM I-1572 (in short, *L paracasei* DG®) was sub-cultured in MRS agar and a single colony was inoculated into culture broth and incubated for 18 hours at 37° C. under microaerophilic conditions. The obtained culture was then centrifuged, washed twice with sterile saline solution and the cell pellet was resuspended with a suitable volume of an aqueous solution of 20% sucrose+10% glycerol (w/vol). The optical density (OD 600 nm) was then measured and the suspension was diluted to OD=1.00. The suspension was then divided into aliquots of 150 μl/each and the aliquots were frozen at −20° C. until delivery on dry ice to the Department of Molecular Medicine of the University of Padua. The decimal count of aliquots on selective medium allowed to quantify the live cell concentration equal to $1.6 \times 10^9$ CFU/ml of suspension ($2.4 \times 10^8$ CFU/aliquot). At the same time, the AAT laboratory prepared the aliquots of vitamin D3 (cholecalciferol) purchased from Sigma Aldrich.

Each animal received specific treatment by means of gastric probe.

Based on the previous literature, it was decided to administer the mice with vitamin D3 in refined olive oil (DIBASE 50,000 IU/2.5 ml) equal to 10,000 IU per Kg of body weight. Considering an average weight of the mice of about 50 grams, 25 μl-aliquots of vitamin D3 each containing 500 IU of vitamin were prepared. These aliquots were used both for one-shot administration and for one-week daily administration. Mice receiving probiotic bacterial strains were dosed with $10^8$ CFU of *L paracasei* DG® in a one-week daily single administration.

The single aliquots of strain *L. paracasei* DG® and vitamin D3 were stored at a suitable temperature at the University of Padua and used daily when administering to mice, taking 100 μl of aliquot of *L. paracasei* DG®, eliminating the remaining residue, and the entire aliquot of vitamin D3.

Treatment of Animals

Mice were sacrificed 3 hours after the end of administration following fluorane anaesthesia and subsequent collection of blood by means of cardiac puncture and removal of the terminal ileum. The blood was centrifuged for the separation of serum which was then frozen until the subsequent dose of vitamin D3, in the form of 25-hydroxyvitamin D (abbreviated as $25(OH)_2D$ or $25(OH)D$). The terminal ileum was first washed with PBS and then subjected to the collection of mucosa and the subsequent freezing in liquid nitrogen. mRNA was then extracted for the quantification of the expression of the vitamin D receptor at mucosal level.

Dosage of the Vitamin in the Serum—Method

25(OH)D was dosed in the serum of the treated mice and in the controls by means of the ELISA assay (25OH Vitamin D total ELISA, Gentaur, Bergamo, IT). This determination allows to accurately estimate the vitamin D repletion (reserve) condition of the animal organism. Blood levels are normally expressed in nmol/litre or ng/ml of serum. In humans, deficiency conditions are identified for values of 25(OH)D lower than 20 ng/ml serum, while values in the range of 20-30 are considered insufficient in any case. The data are reported as mean±standard deviation. Statistical analysis was conducted using the unpaired Student's t-test. Differences were deemed significant at $p<0.05$.

Quantification of the Receptor in the Mucosa—Method

The terminal ileum was first washed with PBS and then subjected to the collection of mucosa and the subsequent freezing in liquid nitrogen. mRNA was then extracted for the quantification of the expression of the vitamin D receptor at mucosal level. From an operational point of view, total RNA extraction from the mucosa was performed first, then a 30 ng aliquot of total RNA was reverse transcribed to cDNA and then subjected to a quantitative PCR with primers for the vitamin D receptor VDR (described by Wu et al. 2010). Below is the summary of the sequence of primers:

```
                                          (SEQ ID NO: 1)
    hVDR F 5'-GGACTGCCGCATCACCAA-3'

(SEQ ID NO: 2)
    hVDR R 5'-TCATCTCCCGCTTCCTCT-3'
```

RT-PCR analyses were also conducted using an "absolute" negative control and a housekeeping gene to normalise the results obtained (e.g. β-actin).

Dosage of Vitamin D3—Results

As shown in FIG. 1 (A and B) and FIG. 1.*bis*, the dosage of 25(OH)D by means of ELISA assay revealed consistent serum vitamin concentration values with respect to data available in literature.

In CD-1 control mice following a regular chow diet (group 1), serum levels of 25 (OH) D were comprised between 36 and 71 ng/ml (mean±standard deviation 58±13 ng/ml; FIG. 1.*bis*).

One-shot administration of vitamin D3 did not result in (group 2) a significant change in serum levels of 25(OH)D (25-hydroxyvitamin D), both in the absence and in the presence of co-administration of the strain *L. paracasei* DG® (group 4), since the concentrations detected in these cases did not statistically significantly differ from the levels detected in the control group (treatment-free). Similarly, the administration of the strain *L. paracasei* DG® alone did not produce significant changes (group 3), indicating that the strain *L. paracasei* DG® per se had no effect on the bioavailability of vitamin D3 under the tested conditions. On the other hand, in the case of daily co-administration of vitamin D3 and of the strain *L. paracasei* DG® in the dosage of about 2.0×10[CFU/day for 7 days, a statistically significant increase in the vitamin D3 serum levels was observed. Such observation demonstrates a synergistic action, presumably at the mucosal level, of the strain in enhancing the increase in vitamin bioavailability. Such assumption is reinforced following the results of the control group, represented by the administration of vitamin D3 alone for one week (group 6), which did not generate any statistically significant change in the serum concentration of 25(OH)D. A statistically significant change in bioavailability was instead detected for the group of mice that received the one-week daily co-administration of the strain *L. paracasei* DG® and vitamin D3.

In detail, the serum level of 25(OH)D was slightly but significantly higher after single-dose supplementation of vitamin D3 (group 2; 67±4 ng/ml) with respect to the one-week daily dose supplementation of vitamin D3 (group 6; 54±6 ng/ml). Administration of bacterial strain *L. paracasei* DG® (group 3; 56±10 ng/ml) and of vitamin D3+*L. paracasei* DG® single dose (group 4; 57±6 ng ml) (FIG. 1.*bis*). Overall, the serum levels of 25(OH)D for mice in groups 1, 2, 3, 4 and 6 were all in the range from 35 to 74 ng/ml (58±10 ng/ml). On the contrary, when $10^8$ CFU of *L. paracasei* DG® were administered combined with the vitamin D3 supplement once daily for one week, the serum concentration of 25(OH)D ranged from 84 to 89 ng/ml (group 5; 88±2 ng/ml) (FIG. 1.*bis*), corresponding approximately to a 50% increase with respect to the control group.

Expression of the Vitamin D Receptor —Results

Figure 2:
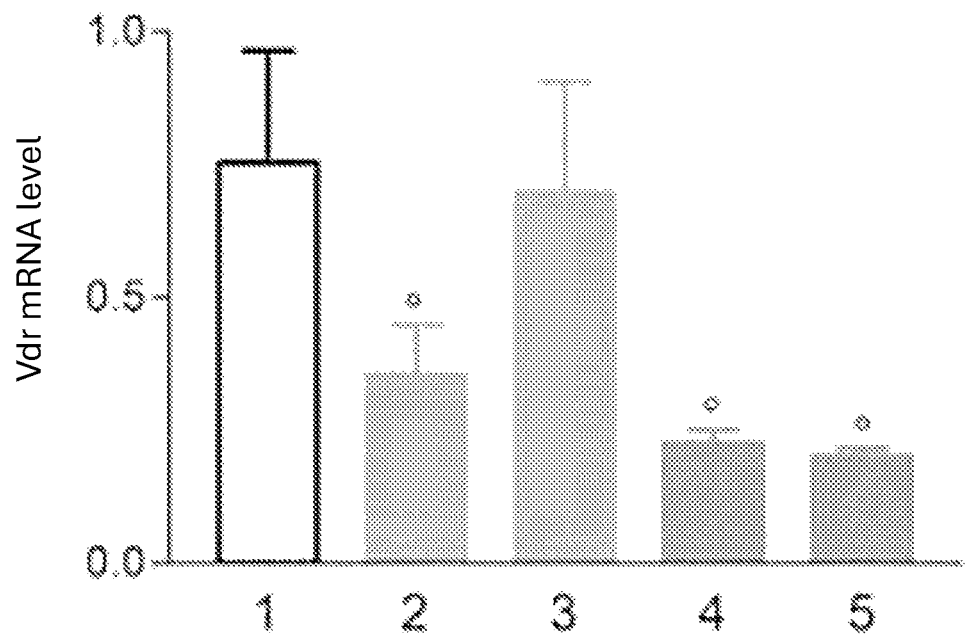
FIG. 2: expression levels in the ileal mucosa of the vitamin D receptor for the vitamin D measured in the in vivo study reported in the experimental part (A.2).

As shown in FIG. 2, quantification of the vitamin D receptor messenger RNA in the mucosa of the groups of mice under study indicated that administration of the strain *L. paracasei* DG® alone for one week did not change the receptor expression level with respect to the treatment-free control group. The administration of a single dose of vitamin D3, on the other hand, resulted in a statistically significant decrease in receptor levels at the level of ileal mucosa (group 2). An even more marked decrease was observed when vitamin D3 was co-administered with the strain *L. paracasei* DG® irrespective of whether vitamin D3 was taken in a single dose at the end of treatment with the strain *L. paracasei* DG® (group 4) or with a one-week daily administration combined with the strain *L. paracasei* DG® (group 5) or with a one-week daily administration of vitamin D3 alone (group 6).

At a first analysis of the data and according to the evaluation of the available treatment groups, a synergistic effect is observed between the administration of vitamin D3 and the administration of the strain *L. paracasei* DG®, given that the administration of both treatments "boosts" the receptor covering/quenching effect already observed for the administration of vitamin D3 alone. As already reported in the previous paragraph, such observation shows a synergy effect between the strain *L. paracasei* DG® and vitamin D3 which results in a higher bioavailability of the vitamin. In order to verify this assumption, receptor expression was also verified in group 6, treated with vitamin D3 alone for 7 days. This test gave a negative outcome, reinforcing the hypothesis of the synergistic effect between the strain *L. paracasei* DG® and vitamin D3.

CONCLUSIONS

Blood levels of vitamin D3 (25(OH)D) are normally expressed in nmol/litre or ng/ml or in ng/ml of serum. In humans, deficiency conditions are identified for values of 25(OH)D lower than 20 ng/ml serum, while values in the range of 20-30 are considered insufficient in any case.

In the murine model, according to the available literature, prolonged treatments are required, even more than 4 weeks, to obtain significant serum levels of vitamin D in animals with vitamin D3 deficiency induced by special dietary interventions.

Based on the results of the present study, there was observed a synergistic effect linked to the co-administration of vitamin D3 and the strain *L. paracasei* DG® which could lead to the following beneficial effects for the host:

A—a direct effect linked to an increase in the bioavailability of vitamin D, expressed by increasing the levels of vitamin D in the serum of animals treated with co-administration with respect to the ones treated with vitamin D3 alone, irrespective of the duration of treatment;

B—an indirect effect linked to the modification of the kinetics of expression of vitamin D receptors at the level of the ileal mucosa, for example resulting in a faster recovery of vitamin D at the intestinal level.

In the light of the results obtained as a result of the supplementation of the activities, obtained by introducing the treatment group 6, receiving vitamin D3 alone for at least one week, we can lean toward assumption A which leads to the simultaneous administration of vitamin D3 and of the strain *L. paracasei* DG® as an effective instrument in increasing the bioavailability of vitamin D at serum level.

(B) Clinical Study

1. Purpose of the Study

The purpose of this double-blind, exploratory, randomised, controlled, single-centre clinical study is to evaluate the role of *L. casei* DG® (*Lactobacillus paracasei* CNCM-11572) in facilitating and increasing the gastrointestinal absorption of Vitamin D in paediatric subjects aged between 3 and 12 years with a baseline serum level of Vitamin D (25(OH) 2D) 10 ng/ml and 20 ng/ml. Below are the objectives of the clinical study.

Primary Objective

Evaluating the different absorption of Vitamin D (Vit. D) in subjects treated with supplementation of Vit. D combined with a probiotic containing *L. casei* DG® and in subjects treated with vitamin D supplementation alone.

Secondary Objectives

Evaluating:
 Stool consistency and daily defecation rate, through re-ordered data from the diaries of the subjects;
 Recovery of the strain *L. casei* DG® (*Lactobacillus paracasei* CNCM-I 1572) in the faeces.

Exploratory Objectives
 Modulation of the microbiota in the intestine;
 Modulation of relevant metabolites, including short chain fatty acid (SCFA).

2. Efficacy Evaluation

Evaluation of the efficacy of the addition of a probiotic containing *L casei* DG® to a fixed supplementation dose of Vit. D will be determined mainly based on the aforementioned primary objective.

The primary objective will be evaluated through the following primary Endpoint:
 Changes in serum levels of Vit. D in children treated for 6 weeks with daily supplementation with an oral formulation of Vit D combined with an oral probiotic containing *L. casei* DG®, with respect to children with the same characteristics and treated for 6 weeks with the same daily supplementation dose of vitamin D, over the entire treatment period of the study.

Subordinately, other efficacy evaluations will be the evaluation of the following Secondary Endpoints:
 Changes in the defecation rate and stool consistency (evaluated based on the Bristol Stool Scale) through data recorded in the patient's diary during the treatment period, both within each group and between the treatment groups;
 Recovery of *L. casei* DG® in faeces, at the end of the treatment period, with respect to the baseline.

The recovery of *L. casei* DG® in faeces will be evaluated by means of real-time polymerase chain reaction (PCR).

Exploratory Endpoints:
 Evaluation of changes in alpha and beta diversity indices and relative taxonomic abundance between the two trial groups;
 Evaluation of metabolite changes, including the SCFA, between the two trial groups.

3. Experimental Design

This is a double-blind, exploratory, randomised, controlled, single-centre clinical study. The purpose of this study is to evaluate the role of *L. casei* DG® (*Lactobacillus paracasei* CNCM-11572) in facilitating and increasing the gastrointestinal absorption of Vit D in paediatric subjects aged between 3 and 12 years with a serum level of Vit D (25(OH)2D) 10 ng/ml and 20 ng/ml. The study is primarily designed to evaluate the different absorption of Vit D between subjects aged between 3 and 12 years who were administered with a daily oral formulation of Vit D combined with an oral probiotic containing *L. casei* DG® and a group of subjects having the same characteristics and belonging to the same age group who were administered with the same daily dose and the same oral formulation of Vitamin D (administered based on the current guidelines). Absorption of Vit D is determined by evaluating the serum levels of 25-hydroxyvitamin D (25(OH)2D) at scheduled visits. The study requires the recruitment of approximately 46 eligible subjects of both sexes (male and female), aged between 3 and 12 years, with Vit D serum levels 10 ng/ml and 20 ng/ml.

Patients are randomised to one of the following two treatment groups:
- Study treatment group: supplementation with drinkable phials containing Vit D 1800 IU (45 µg)+8 billion live cells of probiotic strain L. casei DG® (Lactobacillus paracasei CNCM-11572). The study product will be administered daily (1 drinkable vial per day) for 6 weeks at the doses indicated above (see section 9.6 Product count).
- Control group: the supplementation of the comparator product consists of drinkable phials containing a supplementation of Vitamin D 1800 IU (45 µg) alone. The comparator product is administered daily (1 drinkable vial per day) for 6 weeks.

The study and comparator product are formulated in drinkable phials having identical packaging, colour, weight, odour and taste. Investigators and Parents/legal guardians are not aware of the treatment group assigned to their child. The Investigator shall provide information on the purpose of the study, characteristics and administration of treatments to patients and their parents/legal guardians.

Both study treatments (study and comparator product) are administered under fasting, 30-60 minutes before meals, 1 drinkable vial daily for 6 weeks, Given that the endogenous production of Vit D is strongly increased by the exposure of the subjects to sunlight in summer (approximately from late May to late September in Italy), the subject recruitment period is limited to the winter-spring months (December—mid April) only. Thus, an eligible patient recruited in mid-April will be treated for 6 weeks until the end of May. In this manner, the risk of exposing the subjects to summer sunlight will be minimised, thus reducing the bias of clinical misinterpretation of the Vit D serum levels as much as possible.

Each potential subject, eligible to be recruited in the present study, is duly informed by the investigators who will use a type of language suitable to their age. At the same time, investigators provide both parents/legal guardians of the child with an informed consent document to be signed before submitting the child to any screening procedure aimed at evaluating their inclusion in the study.

Figure 3:
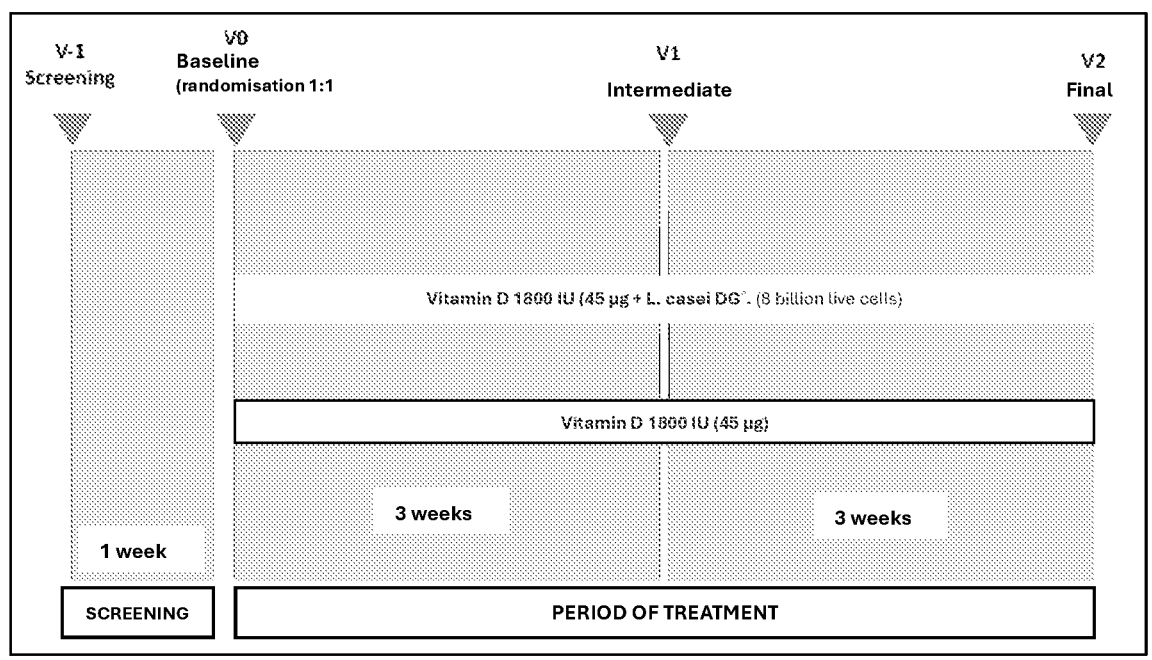
FIG. 3 is a schematic representation of the clinical study design (experimental part (B)).

Overall, the study design involves 4 visits (FIG. 3):
- V-1 (screening visit). This is the first visit of the study and it can be carried out in any of the 7 days prior to the subsequent visit of the study (baseline visit). During this visit the Investigator ensures that the subject meets all inclusion/exclusion criteria: blood is collected from the subject to test the Vit D serum levels and other blood parameters, and an objective examination (see paragraph 10.1 V-1 Screening visit and study procedures).
- V0 (baseline visit). This visit is carried out after recruiting the subject into the study and after conducting all procedures scheduled based on the previous visit (screening visit). This is the randomisation visit in which each subject will start the treatment was assigned thereto (see paragraph 10.2 V0 Baseline visit and randomisation procedure).
- V1 (week 3±3 days). This is the intermediate study visit to be carried out approximately 3 weeks after baseline. The same laboratory tests and the same clinical evaluation described in visit V-1 (screening visit) are carried out at this visit (see paragraph 10.3 V1 and intermediate procedures).
- V2 (week 6±3 days). This is the last visit of the study and the end of study treatment (6 weeks after baseline). The same laboratory tests and the same clinical evaluation described in visit V-1 (screening visit) are carried out at this visit (see paragraph 10.3 V2 and procedures at the end of the study).

Safety and tolerability, use of concomitant drugs and/or medical procedures are monitored throughout the study. In addition, Parents/legal guardians are required to record any adverse events in the Patient's Diary.

4. Patient Population

The study involves children of both sexes (male and female), of any race, aged between 3 and 12 years, with Vit D (25(OH) 2D) serum levels ≥10 ng/ml and 20 ng/ml.

5. Inclusion Criteria
- Children ≥3 and ≤12 years of age (patients who did not exceed 12 years of age at the time of study inclusion) are deemed eligible.
- Vit. D serum levels ≥10 ng/ml and ≤20 ng/ml at screening;
- Acceptance of the study by the patient and written informed consent to take part in the study submitted by both parents/guardians.

6. Study Treatments
- STUDY TREATMENT: L. casei DG® (L. paracasei CNCM I-1572)+Vitamin D, Product included in the Register of Food Supplements of the Ministry of Health (Trade name: Enterolactis D).

Class: Dietary Supplement
Description: Single-dose drinkable phials with reservoir cap. The product must be combined with the liquid phase.
Main Components:
- L. casei DG® (Lactobacillus paracasei CNCMI-1572)
- Vitamin D Each drinkable vial has the following composition:
Ingredients of the solid phase: L. casei DG® (Lactobacillus paracasei CNCMI-1572); powdered cholecalciferol (vitamin D3, medium chain triglycerides, gum arabic (acacia gum) (E 414), sucrose, starch, alpha-tocopherol (E307), tricalcium phosphate (E341 iii)).
For the Daily Dose (1 Vial)
- L. casei DG® 8 bIn. C.F.U.
- Vitamin D3 45,000 mcg/1800 1.U.

Ingredients of the liquid phase: Purified water; fructose; acidifier: citric acid (E 330); flavour enhancement agent; preservative: potassium sorbate (E 202); preservative: sodium benzoate.

Comparator Treatment
Vitamin D—Product included in the Register of Food Supplements of the Ministry of Health (Trade name: Vitamin D).
Class: Dietary Supplement
Description: Single-dose drinkable phials with reservoir cap. The product must be combined with the liquid phase.
Main Components:
- Vitamin D Each drinkable vial has the following composition: Ingredients of the solid phase: Mannitol; Inulin—fructo-oligosaccharides; sweetener: maltitols (E 965); Powdered cholecalciferol [vitamin D3, medium chain triglycerides, gum arabic (acacia gum) (E 414), sucrose, starch, alpha-tocopherol (E307), tricalcium phosphate (E341 iii)].
For the Daily Dose (1 Vial)
- Vitamin D3 45,000 mcg/1800 I.U.

Ingredients of the liquid phase: Purified water; fructose; acidifier: citric acid (E 330); flavour enhancement agent; preservative: potassium sorbate (E 202); preservative: sodium benzoate.

Statistical Analysis

The data are presented using descriptive statistics. In general, categorical variables are presented as numbers and percentages, and continuous variables, after the evaluation of normality by applying the Kolmogorov-Smirnov test, are presented as mean values, standard deviation (SD) or median value with interquartile range, as appropriate.

The invention claimed is:

1. A method of treating a patient having a vitamin D deficiency and/or insufficiency (or hypovitaminosis D) and/or of a disease, symptom and/or disorder associated with said vitamin D deficiency, comprising administering to the patient a bacterial strain belongs to the species *Lactobacillus paracasei*, reclassified *Lacticaseibacillus paracasei*, wherein said bacterial strain belongs to the species *Lactobacillus paracasei* is selected from the group consisting of:
  a bacterial strain belonging to the species *Lactobacillus paracasei* identified as *Lactobacillus paracasei* DG® and deposited at the National Collection of Cultures of Microorganisms of the Pasteur Institute in Paris under the accession number CNCM I-1572 and name *Lactobacillus casei* DG® sub. *casei*, and
  a bacterial strain belonging to the species *Lactobacillus paracasei* identified as *Lactobacillus paracasei* LPC-SO1® and deposited at Deutsche Sammlung van Mikroorganismen und Zellkulturen GmbH (DSMZ) under the accession number DSM 26760, and a mixture thereof thereby increasing vitamin D levels in the subject.

2. The method of claim 1, wherein said vitamin D deficiency is a vitamin D3 (cholecalciferol) and/or vitamin D2 (ergocalciferol) deficiency and/or insufficiency.

3. The method of claim 1, wherein said bacterial strain is administered associated/combined with vitamin D, wherein said administration of said bacterial strain and of vitamin D is simultaneous or delayed over time.

4. The method of claim 1, wherein said disease, symptom and/or disorder is selected from: rickets, fragile bones, bone deformation, osteoporosis, osteomalacia, bone pain, joint pain, bone fragility, hypocalcaemia, hypophosphatemia, bone abnormalities due to demineralisation defects.

5. The method of claim 2, wherein said vitamin D deficiency is a vitamin D3 deficiency and/or insufficiency.

6. The method according to claim 3, wherein said bacterial strain is administered associated/combined with vitamin D3.

* * * * *

SEQUENCE LISTING

```
<160> NUMBER OF SEQ ID NOS: 2

<210> SEQ ID NO 1
<211> LENGTH: 18
<212> TYPE: DNA
<213> ORGANISM: Artificial Sequence
<220> FEATURE:
<223> OTHER INFORMATION: Primer F

<400> SEQUENCE: 1
ggactgccgc atcaccaa                                               18

<210> SEQ ID NO 2
<211> LENGTH: 18
<212> TYPE: DNA
<213> ORGANISM: Artificial Sequence
<220> FEATURE:
<223> OTHER INFORMATION: Primer R

<400> SEQUENCE: 2
tcatctcccg cttcctct                                               18
```